UNITED STATES PATENT OFFICE.

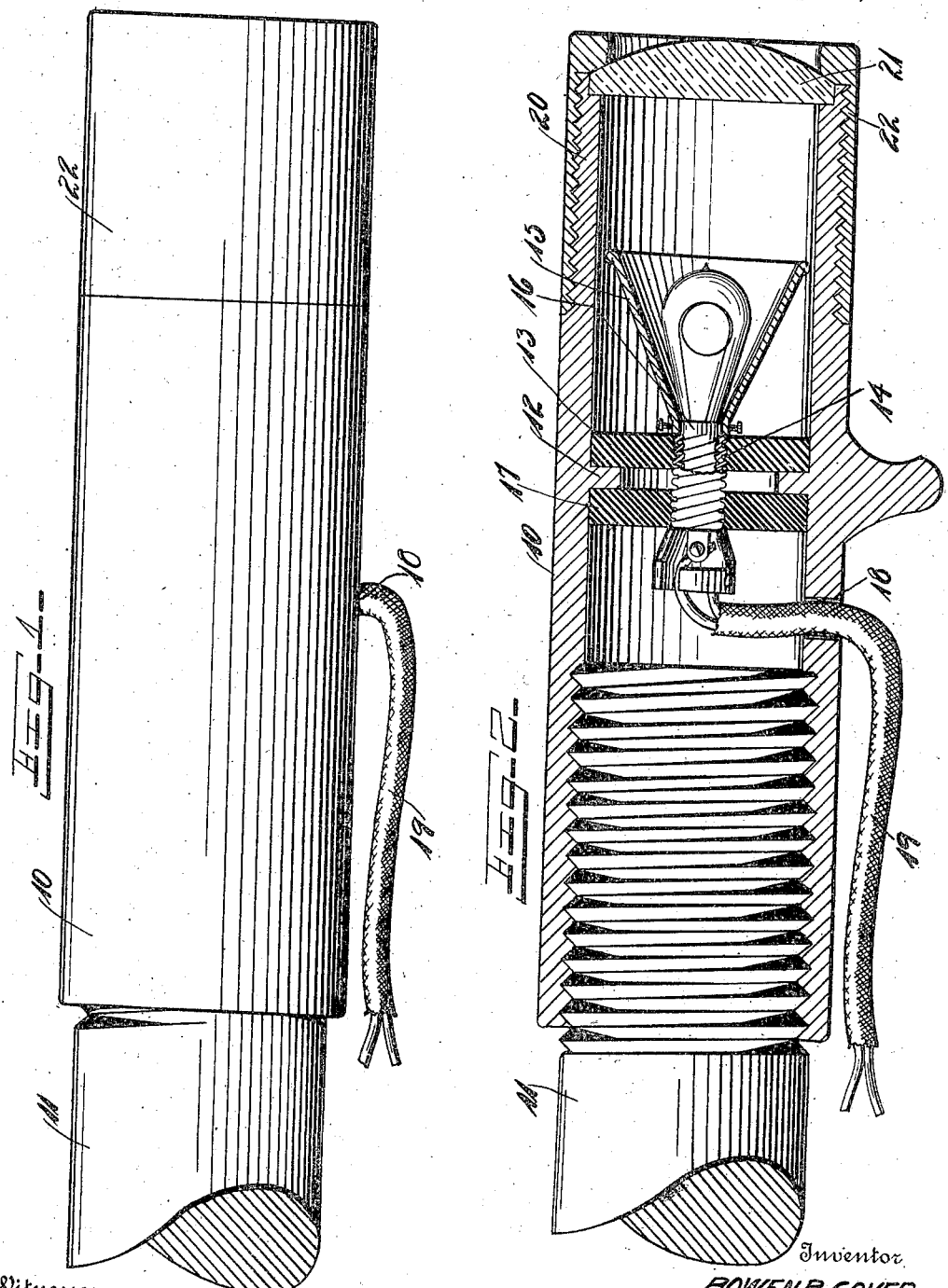

BOWEN R. GOVER, OF NEWTON, IOWA.

HEADLIGHT FOR VEHICLES.

971,265.   Specification of Letters Patent.   Patented Sept. 27, 1910.

Application filed June 20, 1910. Serial No. 567,878.

*To all whom it may concern:*

Be it known that I, BOWEN R. GOVER, a citizen of the United States, residing at Newton, in the county of Jasper, State of Iowa, have invented certain new and useful Improvements in Headlights for Vehicles; and I do hereby declare the following to be a full, clear, and exact description of the invention, such as will enable others skilled in the art to which it appertains to make and use the same.

This invention relates to vehicles and has special reference to a headlight for vehicles adapted to be attached to the shaft or pole of a vehicle.

One object of the invention is to provide a novel device of this character wherein the pole or shaft iron will serve to carry a headlight arranged to project a beam of light in front of a vehicle.

Another object of the invention is to provide a novel form of tubular light adapted to be applied to the shaft or pole of a vehicle, means being provided for resiliently supporting an electric lamp therein.

With the above and other objects in view, the invention consists in general of a headlight of novel construction adapted to be applied to the shaft or pole of a vehicle.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a side elevation of the device as intended for application to a shaft. Fig. 2 is a slight modification of the invention as applied to a pole, the device being shown in section.

The numeral 10 indicates a cylindrical casing which is provided with suitable means to engage the end of a shaft or pole 11. Between the ends of this casing is provided an internal annular flange 12 against which rests an elastic washer 13 preferably of rubber and provided with a centrally disposed opening 14. This washer is located in front of the flange 12 and at 15 is indicated a reflector of the ordinary type, this reflector being provided at its inner end with a lamp socket 16, which is screwed through the opening in the elastic washer 13 and into a similar opening in a washer 17 held immediately behind the flange 12. By thus having the socket engage both washers the same are held fixed in the casing 10 while at the same time they may be readily removed by unscrewing the socket.

Leading out of a suitable opening 18 formed in the casing 10 is a two-wire cable 19 which is connected in the usual manner to the socket 16. This cable is conducted back along the pole or shaft to the vehicle body and is there connected to a suitable battery or other source of power and is provided with a switch so that the light may be turned on or off as desired. This feature of the device is not here shown as the same forms no part of the invention, any ordinary battery, switch and connections being adapted to be used.

The front end of the casing 10 is reduced and threaded as at 20 and on this front end is secured a transparent closure 21, this closure being preferably what is termed a bull's eye lens. This lens is held in position on the casing by means of a lens ring 22 screwed onto the portion 20 of the casing and this lens ring is of such dimensions that its outer surface is coterminous with the outer surface of the body of the casing when so positioned.

It is to be noted that the reflector 15 is free from contact with the casing and that the lamp is thus supported by the resilient washers so that the vibration of the casing will not injure either the lamp or reflector.

There has thus been provided a simple and efficient device of the kind described and for the purpose specified.

Having thus described the invention, what is claimed as new, is:—

1. In a device of the kind described, a cylindrical casing adapted to engage the end of a vehicle shaft or pole, an annular flange extending around the inside of said casing intermediate its ends, an elastic washer held against said flange and having a centrally disposed opening spaced from said flange, a reflector having a lamp socket attached to one end, said socket being screwed into the opening in the washer, and transparent means to close the end of said casing.

2. In a device of the kind described, a cylindrical casing adapted to engage the end of a vehicle shaft or pole, an annular flange extending around the inside of said casing intermediate its ends, an elastic washer held against said flange and having a centrally disposed opening spaced from said flange, a reflector having a lamp socket attached to one end, said socket being screwed into the opening in the washer, a lens closing the end of said casing, and a lens ring screwed on said casing to hold said lens in position.

3. In a device of the kind described, a cylindrical casing adapted to engage the end of a vehicle shaft or pole, an annular flange extending around the inside of said casing intermediate its ends, an elastic washer held against said flange and having a centrally disposed opening spaced from said flange, a reflector having a lamp socket attached to one end, said socket being screwed into the opening in the washer, a lens closing the end of said casing, a lens ring screwed on said casing to hold said lens in position, and an incandescent lamp held in said socket.

In testimony whereof, I affix my signature, in presence of two witnesses.

BOWEN R. GOVER.

Witnesses:
L. S. LYDAY,
R. L. ARNOLD.